(12) United States Patent
Kim et al.

(10) Patent No.: US 12,105,028 B1
(45) Date of Patent: Oct. 1, 2024

(54) APPARATUS FOR GENERATING MODEL FOR SPECTROSCOPIC ELLIPSOMETRY CONSTANT ANALYSIS AND METHOD THEREFOR

(71) Applicant: AUROS Technology, Inc., Hwaseong-si (KR)

(72) Inventors: Sang Jun Kim, Hwaseong-si (KR); Dae Won Kwon, Hwaseong-si (KR)

(73) Assignee: AUROS Technology, Inc., Hwaseong-si (KR)

( * ) Notice: Subject to any disclaimer, the term of this patent is extended or adjusted under 35 U.S.C. 154(b) by 0 days.

(21) Appl. No.: 18/474,205

(22) Filed: Sep. 25, 2023

(51) Int. Cl.
*G01N 21/95* (2006.01)
*G01N 21/21* (2006.01)
*G01N 21/84* (2006.01)

(52) U.S. Cl.
CPC ....... *G01N 21/9501* (2013.01); *G01N 21/211* (2013.01); *G01N 21/8422* (2013.01); *G01N 2021/213* (2013.01)

(58) Field of Classification Search
CPC ............. G01N 21/9501; G01N 21/211; G01N 21/8422; G01N 2021/213
See application file for complete search history.

(56) References Cited

U.S. PATENT DOCUMENTS

| 5,581,350 | A | * | 12/1996 | Chen | G01N 21/211 356/369 |
| 6,734,967 | B1 | * | 5/2004 | Piwonka-Corle | G01N 21/211 356/369 |
| 6,858,454 | B1 | * | 2/2005 | Kanzawa | G01N 21/211 438/16 |
| 7,167,241 | B1 | * | 1/2007 | Johs | G01B 11/0641 356/369 |
| 9,404,872 | B1 | * | 8/2016 | Wang | G01N 21/274 |

(Continued)

FOREIGN PATENT DOCUMENTS

| CN | 111121653 | A | * | 5/2020 | ......... G01B 11/0625 |
| KR | 20140130423 | A | * | 11/2014 | ............. G01B 11/00 |
| KR | 20160014722 | A | * | 2/2016 | ......... G03F 7/70616 |

OTHER PUBLICATIONS

Kim et al. Determination of optical constants and thickness of organic electroluminescence thin films using variable angle spectroscopic ellipsometry. Korean Journal of Optics and Photonics, vol. 12, No. 6, Dec. 2001. (Year: 2001).*

(Continued)

*Primary Examiner* — Mohamed K Amara
(74) *Attorney, Agent, or Firm* — NKL LAW; Jae Youn Kim

(57) ABSTRACT

A method of quality control and testing for manufactured semiconductors by generating a model for spectroscopic ellipsometry constant analysis includes: calculating, by an operator, simulation data representing a spectroscopic ellipsometry constant of an analysis target through reasoning on (Continued)

attribute data representing an attribute of the analysis target using a simulation model; calculating, by an error calculator, an error representing a difference between actual measured data obtained by measuring the spectroscopic ellipsometry constant of the analysis target and the simulation data; and performing optimization in which an optimizer modifies a parameter of the simulation model according to the error.

14 Claims, 6 Drawing Sheets

(56) References Cited

U.S. PATENT DOCUMENTS

| | | | | |
|---|---|---|---|---|
| 11,674,909 | B2* | 6/2023 | Wang | G01N 21/211 356/237.5 |
| 2002/0106848 | A1* | 8/2002 | Wack | G03F 7/70658 438/200 |
| 2007/0019205 | A1* | 1/2007 | Namkoong | G01N 21/8422 356/503 |
| 2010/0068834 | A1* | 3/2010 | Hachigo | G01N 21/211 257/E21.53 |
| 2013/0010296 | A1* | 1/2013 | Kwak | G01N 21/211 356/369 |
| 2013/0211760 | A1* | 8/2013 | Chu | G03F 7/70625 702/81 |
| 2014/0264032 | A1* | 9/2014 | Neshat | G01J 3/42 250/339.08 |
| 2016/0157828 | A1* | 6/2016 | Sumi | G01N 29/46 702/189 |
| 2017/0212285 | A1* | 7/2017 | Arbabi | G02B 1/002 |
| 2019/0107781 | A1* | 4/2019 | Tinnemans | G03F 7/70625 |
| 2020/0025554 | A1* | 1/2020 | Gellineau | G01N 21/211 |
| 2023/0324283 | A1* | 10/2023 | Zawaideh | G01J 3/447 356/327 |

OTHER PUBLICATIONS

Chunfu et al. A Combination of library search and Levenberg-Marquardt algorithm in optical scatterometry. Thin Solid Films, vol. 767, Feb. 2023. See abstract, 1-4 pages (Year: 2023).*

Samuel et al. Multiple minima in the ellipsometric error function. Thin Solid Films, vol. 313-314, 124-127 pages. Feb. 1998. See abstract, 124-127 pages. (Year: 1998).*

Sang Youl Kim et al. Determination of optical constants and thickness of organic electroluminescence thin films using variable angle spectroscopic ellipsometry, Hankook Kwanghak Hoeji, vol. 12, No. 6, Dec. 2001.

Guo et al. A combination of library search and Levenberg-Marquardt algorithm in optical scatterometry. Thin Solid Films, vol. 767, No. 28, Feb. 2023.

* cited by examiner

APPARATUS FOR GENERATING MODEL FOR SPECTROSCOPIC ELLIPSOMETRY CONSTANT ANALYSIS AND METHOD THEREFOR

BACKGROUND OF THE INVENTION

1. Field of the Invention

The present disclosure relates to a system and method for manufacturing semiconductors, and more particularly, to a system and method for quality control and testing of manufactured semiconductors using model generation technique, such as generating a model for spectroscopic ellipsometry constant analysis.

The present invention was supported by the national research and development program as follows.

| | |
|---|---|
| Project identification number | 1425175850 |
| Detailed project number | 00217248 |
| Department name | Ministry of Small and Medium-sized Enterprises and Micro Enterprises |
| Name of project management organization | Korea Technology and Information Promotion Agency for Small and Medium Enterprises |
| Research program name | Technology innovation development of Small and Medium Enterprises (R&D) |
| Title of research project | Development of optical metrology system for semiconductor with 20 μm spot and 175 nm DUV wavelength using spectroscopic ellipsometry |
| Contribution rate | 100% |
| Name of organization carrying out the project | AUROS Technology, Inc. |
| Research period | 2023.04.01~2023.12.31 |

2. Description of the Background Art

It is well known that manufacturing semiconductors starts with the creation of a silicon wafer, and then, cleaning the prepared wafer. Later, for patterning the wafer's surface with circuit design, a photolithography process will be conducted. Layers of materials, such as, silicon dioxide and conductive metals, are deposited and etched onto the thin film for making transistors, interconnects, and other components, and then, ion implantation, which modifies the electrical properties of the silicon, is processed thereafter. Next, multiple layers of insulators and conductors are added, and a high temperature is also applied to the wafer for dopant activation and junction formation. And, the wafer is diced into individual chips, which are then packaged for protection and electrical connections. Generally, quality control and testing throughout the manufacturing process should be conducted for functionality and reliability of the semiconductors. As an example, a method of ellipsometry has been used.

Ellipsometry is an analysis method that derives the optical characteristics of a material by using the property that the polarization state of light changes according to the refractive index or thickness of a medium when the light incident on the material is reflected or transmitted on the surface of the medium.

Spectroscopic Ellipsometry (SE) is a method for acquiring optical properties such as thickness, structure, refractive index (n), and extinction coefficient (k) of a thin film. The spectroscopic ellipsometry is an optical measurement method in which polarized light controlled by a polarizer is incident on a thin film, reflected or transmitted through the surface, and then the modulated polarization state is measured according to the refractive index or thickness of the thin film to acquire optical properties of the thin film.

The spectroscopic ellipsometry is frequently used for analyzing the optical properties of thin films in various fields such as semiconductors, displays, and optical thin films. However, different from vision method, which directly shows thin film and pattern information, the spectroscopic ellipsometry is obtained by using a modeling technique and a regression analysis method to obtain optical properties of the thin film of the measured spectroscopic ellipsometry constant data by the change in polarization status.

SUMMARY OF THE INVENTION

An aspect of the present disclosure is directed to providing an apparatus, method, and medium for manufacturing semiconductors by generating a model for spectroscopic ellipsometry constant analysis.

In one or more embodiments, there is provided a method of quality control and testing for manufactured semiconductors by generating a model for spectroscopic ellipsometry constant analysis according to a preferred embodiment of the present disclosure, including: calculating, by an operator, simulation data representing a spectroscopic ellipsometry constant of an analysis target through reasoning on attribute data representing an attribute of the analysis target using a simulation model; calculating, by an error calculator, an error representing a difference between actual measurement data obtained by measured the spectroscopic ellipsometry constant of the analysis target and the simulation data; and performing optimization in which an optimizer modifies a parameter of the simulation model according to the error.

In the performance of the optimization, the optimizer modifies the parameter of the simulation model so that the sum of squares of errors is minimized.

In the performance of the optimization, the optimizer modifies the parameter of the simulation model so that the sum of squares of errors is minimized, and performs optimization by applying a weight for each wavelength to a Jacobian size.

The performance of the optimization is performed by the optimizer according to an equation:

$$p_{k+1} = p_k - \left(J_r'^T J_r' + \mu_k \mathrm{diag}(J_r'^T J_r')\right)^{-1} J_r'^T r'(p_k), k \geq 0$$

$$r'(p) = \omega(\lambda) r(p)$$

$$r(p) = \begin{bmatrix} r_1(p) \\ r_2(p) \\ \vdots \\ r_n(p) \end{bmatrix} = \begin{bmatrix} y_1 - f(x_1, p) \\ y_2 - f(x_2, p) \\ \vdots \\ y_n - f(x_n, p) \end{bmatrix}$$

$$J_r'(p) = \begin{pmatrix} \frac{\partial r_1'(p)}{\partial p_1} & \cdots & \frac{\partial r_1'(p)}{\partial p_m} \\ \vdots & \ddots & \vdots \\ \frac{\partial r_n'(p)}{\partial p_1} & \cdots & \frac{\partial r_n'(p)}{\partial p_m} \end{pmatrix},$$

wherein the p is a parameter of the simulation model, the k is an index of iteration, the r(p) represents a residual, the ω(λ) is a weight for each wavelength, the r'(p) is a residual weighted for each wavelength, the $J_r'$ is a Jacobian matrix, the $\mu_k$ is a damping factor, and the diag($J_r'^T J_r'$) is a diagonal matrix of $J_r'^T J_r'$.

In the calculation of the error, the error calculator calculates the error according to an error function:

$$\chi^2 = \frac{1}{2N-M} \sum_{j=1}^{N} \left[ (\alpha_j^{mod} - \alpha_j^{exp})^2 + (\beta_j^{mod} - \beta_j^{exp})^2 \right],$$

wherein the $\chi^2$ is an error, the N is the number of actual measured data, the M is the number of parameters, the j is an index of wavelengths, the $\alpha_j^{mod}$ is simulation data for a spectroscopic ellipsometry constant $\alpha$, the $\alpha_j^{exp}$ is actual measured data for the spectroscopic ellipsometry constant $\alpha$, the $\beta_j^{mod}$ is simulation data for a spectroscopic ellipsometry constant $\beta$, and the $\beta_j^{exp}$ is actual measured data for the spectroscopic ellipsometry constant $\beta$.

In the calculation of the error, the error calculator calculates the error according to an error function:

$$\chi^2 = \frac{1}{2N-M} \sum_{i=1}^{N} \left[ (\Psi_i^{mod} - \Psi_i^{exp})^2 + (\Delta_i^{mod} - \Delta_i^{exp})^2 \right]$$

wherein the $\chi^2$ is an error, the N is the number of actual measured data, the M is the number of parameters, the i is an index of wavelengths, the $\Psi_i^{mod}$ is simulation data for a spectroscopic ellipsometry constant $\Psi$, the $\Psi_i^{exp}$ is actual measured data for the spectroscopic ellipsometry constant $\Psi$, the $\Delta_i^{mod}$ is simulation data for a spectroscopic ellipsometry constant $\Delta$, and the $\Delta_i^{exp}$ is actual measured data for the spectroscopic ellipsometry constant $\Delta$.

The method further includes: performing actual measurement in which a measuring device measures the spectroscopic ellipsometry constant of a semiconductor to be measured and derives actual measurement data representing the actually measured spectroscopic ellipsometry constant of the semiconductor; performing a simulation in which an analyzer receives attribute data representing an attribute of the semiconductor, performs the reasoning on the attribute data through the simulation model in which the parameter is decided, and calculates the simulation data representing the spectroscopic ellipsometry constant of the semiconductor; performing error derivation in which the analyzer derives an error representing a difference between the actual measurement data and the simulation data; performing repetition in which the analyzer modifies the attribute data until the error becomes less than a preset threshold, and repeats the simulation and the error derivation based on the modified attribute data; and performing output in which an output interface outputs the modified attribute data as a measurement result when the error becomes less than the preset threshold.

In one or more embodiments, there is provided an apparatus for quality control and testing of manufactured semiconductors by generating a model for spectroscopic ellipsometry constant analysis according to a preferred embodiment of the present disclosure, including: an operator that calculates simulation data representing a spectroscopic ellipsometry constant of an analysis target through reasoning on attribute data representing an attribute of the analysis target using a simulation model; an error calculator that calculates an error representing a difference between actual measurement data obtained by measuring the spectroscopic ellipsometry constant of the analysis target and the simulation data; and an optimizer that performs optimization to modify a parameter of the simulation model according to the error.

The optimizer modifies the parameter of the simulation model so that the sum of squares of errors is minimized.

The optimizer modifies the parameter of the simulation model so that the sum of squares of errors is minimized, and performs optimization by applying a weight for each wavelength to a Jacobian size.

The optimizer performs the optimization according to an equation:

$$p_{k+1} = p_k - \left( J_r'^T J_r' + \mu_k \text{diag}(J_r'^T J_r') \right)^{-1} J_r'^T r'(p_k), k \geq 0$$

$$r'(p) = \omega(\lambda) r(p)$$

$$r(p) = \begin{bmatrix} r_1(p) \\ r_2(p) \\ \vdots \\ r_n(p) \end{bmatrix} = \begin{bmatrix} y_1 - f(x_1, p) \\ y_2 - f(x_2, p) \\ \vdots \\ y_n - f(x_n, p) \end{bmatrix}$$

$$J_r'(p) = \begin{pmatrix} \frac{\partial r_1'(p)}{\partial p_1} & \cdots & \frac{\partial r_1'(p)}{\partial p_m} \\ \vdots & \ddots & \vdots \\ \frac{\partial r_n'(p)}{\partial p_1} & \cdots & \frac{\partial r_n'(p)}{\partial p_m} \end{pmatrix}$$

wherein the p is a parameter of the simulation model, the k is an index of iteration, the r(p) represents a residual, the $\omega(\lambda)$ is a weight for each wavelength, the r'(p) is a residual weighted for each wavelength, the $J_r'$ is a Jacobian matrix, the $\mu_k$ is a damping factor, and the diag($J_r'^T J_r'$) is a diagonal matrix of $J_r'^T J_r'$.

The error calculator calculates the error according to an error function:

$$\chi^2 = \frac{1}{2N-M} \sum_{j=1}^{N} \left[ (\alpha_j^{mod} - \alpha_j^{exp})^2 + (\beta_j^{mod} - \beta_j^{exp})^2 \right],$$

wherein the $\chi^2$ is an error, the N is the number of actual measured data, the M is the number of parameters, the j is an index of wavelengths, the $\alpha_j^{mod}$ is simulation data for a spectroscopic ellipsometry constant $\alpha$, the $\alpha_j^{exp}$ is actual measured data for the spectroscopic ellipsometry constant $\alpha$, the $\beta_j^{mod}$ is simulation data for a spectroscopic ellipsometry constant $\beta$, and the $\beta_j^{exp}$ is actual measured data for the spectroscopic ellipsometry constant $\beta$.

The error calculator calculates the error according to an error function:

$$\chi^2 = \frac{1}{2N-M} \sum_{i=1}^{N} \left[ (\Psi_i^{mod} - \Psi_i^{exp})^2 + (\Delta_i^{mod} - \Delta_i^{exp})^2 \right]$$

wherein the $\chi^2$ is an error, the N is the number of actual measured data, the M is the number of parameters, the i is an index of wavelengths, the $\Psi_i^{mod}$ is simulation data for a spectroscopic ellipsometry constant $\Psi$, the $\Psi_i^{exp}$ is actual measured data for the spectroscopic ellipsometry constant $\Psi$, the $\Delta_i^{mod}$ is simulation data for a spectroscopic ellipsometry constant $\Delta$, and the $\Delta_i^{exp}$ is actual measured data for the spectroscopic ellipsometry constant $\Delta$.

The attribute includes at least one of a material and thickness of the analysis target.

The apparatus further includes: a measuring device that measures a spectroscopic ellipsometry constant of a semiconductor to be measured and derives actual measurement data representing the actually measured spectroscopic ellipsometry constant of the semiconductor; a simulation processor that receives the attribute data representing an attribute of the semiconductor, performs the reasoning on the attribute data through the simulation model in which the parameter is decided, and calculates the simulation data representing the spectroscopic ellipsometry constant of the semiconductor; an analyzer that performs an error derivation process that derives an error representing the difference between the actual measurement data and the simulation data, modifies the attribute data until the error becomes less than a preset threshold, and repeats the simulation process and the error derivation process based on the modified attribute data; and an output interface that outputs the modified attribute data as a measurement result when the error becomes less than the preset threshold.

In one or more embodiments, there is provided a computing device including at least one memory comprising instructions and at least one hardware processor to execute the instructions within the at least one memory to implement: calculating simulation data representing a spectroscopic ellipsometry constant of an analysis target through reasoning on input data representing an attribute of the analysis target using a simulation model; calculating an error representing a difference between actual measurement data obtained by measuring the spectroscopic ellipsometry constant of the analysis target and the simulation data; and performing an optimization to modify a parameter of the simulation model according to the error.

According to an embodiment of the present disclosure, when optimizing to generate a simulation model (SM), a degree of convergence according to the change in a parameter p of the simulation model (SM) can be adjusted for each wavelength by applying a weight for each wavelength to a Jacobian size, which is a partial differential method. Accordingly, it is possible to stably increase the contribution of a wavelength band by giving a small weight to a side with high noise among actual measurement data and a large weight to a stable wavelength band without affecting error calculation.

DETAILED DESCRIPTION OF THE INVENTION

Figure 1:
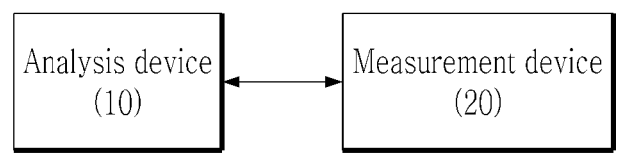
FIG. 1 is a diagram illustrating a configuration of an apparatus for measuring a semiconductor based on a model for spectroscopic ellipsometry constant analysis according to an embodiment of the present disclosure.

The present disclosure may be variously modified and may include various embodiments. Specific embodiments will be exemplarily illustrated in the drawings and described in detail in the detailed description of the embodiments. However, it should be understood that they are not intended to limit the present disclosure to specific embodiments but rather to cover all modifications, equivalents, and alternatives which are included in the spirit and scope of the present disclosure.

The terms used herein are presented for the description of the specific embodiments but are not intended to limit the present disclosure. The terms in singular form may include plural forms unless otherwise specified. It will be understood that the terms "comprising", "including", or "having," when used herein, specify the presence of stated features, integers, steps, operations, elements, components, or combinations thereof, but do not preclude the presence or addition of one or more other features, integers, steps, operations, elements, components, and/or combinations thereof.

Figure 2:
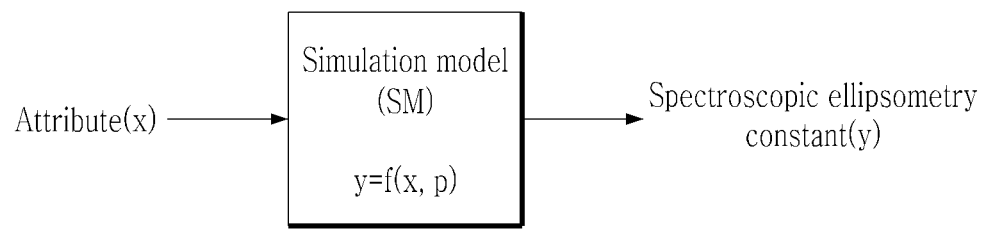
FIG. 2 is a diagram illustrating a simulation model for spectroscopic ellipsometry constant analysis according to an embodiment of the present disclosure.

First, an apparatus for measuring a semiconductor based on a model for spectroscopic ellipsometry constant analysis according to an embodiment of the present disclosure will be described. FIG. 1 is a diagram illustrating a configuration of an apparatus for measuring a semiconductor based on a model for spectroscopic ellipsometry constant analysis according to an embodiment of the present disclosure. FIG. 2 is a diagram illustrating a simulation model for spectroscopic ellipsometry constant analysis according to an embodiment of the present disclosure.

Referring to FIG. 1, the apparatus for measuring a semiconductor based on a model for spectroscopic ellipsometry constant analysis according to an embodiment of the present disclosure includes an analysis device 10 and a measurement device 20.

The analysis device 10 may basically generate a simulation model (SM), which is a model for spectroscopic ellipsometry constant analysis according to an embodiment of the present disclosure, through regression analysis.

As illustrated in FIG. 2, a simulation model (SM) is a model that receives an attribute (x) of an analysis target or measurement target (for example, substrate, thin film, semiconductor, etc.) and performs reasoning on the input attribute data to calculate simulation data representing a spectroscopic ellipsometry constant (y) of the analysis target. Herein, the reasoning is a simulation procedure that performs one or more operations f(x, p) to which one or more parameters (p) are applied to the attribute (x). Herein, the attribute (x) includes the thickness, refractive index (n), and extinction coefficient (k) of each layer of the analysis or measurement target. In an embodiment of the present disclosure, generating the simulation model (SM) means determining a parameter (p) of the simulation model (SM) through regression analysis.

The measurement device 20 is used to measure the spectroscopic ellipsometry constant of a sample to be analyzed or measured (for example, a semiconductor). The measurement device 20 derives the spectroscopic ellipsometry constant through a spectroscopic ellipsometer (SE). A specific example of this measurement device 20 is described in the detailed description in Korean Patent No. 10-2531530. The contents of Korean Patent No. 10-2531530 is incorporated by reference herein. This prior KR patent is not prior art to this present invention as an exception under 35 USC 102(b)(1) because it was disclosed by the applicant within one year or less before the effective filing date of this application.

Figure 7:
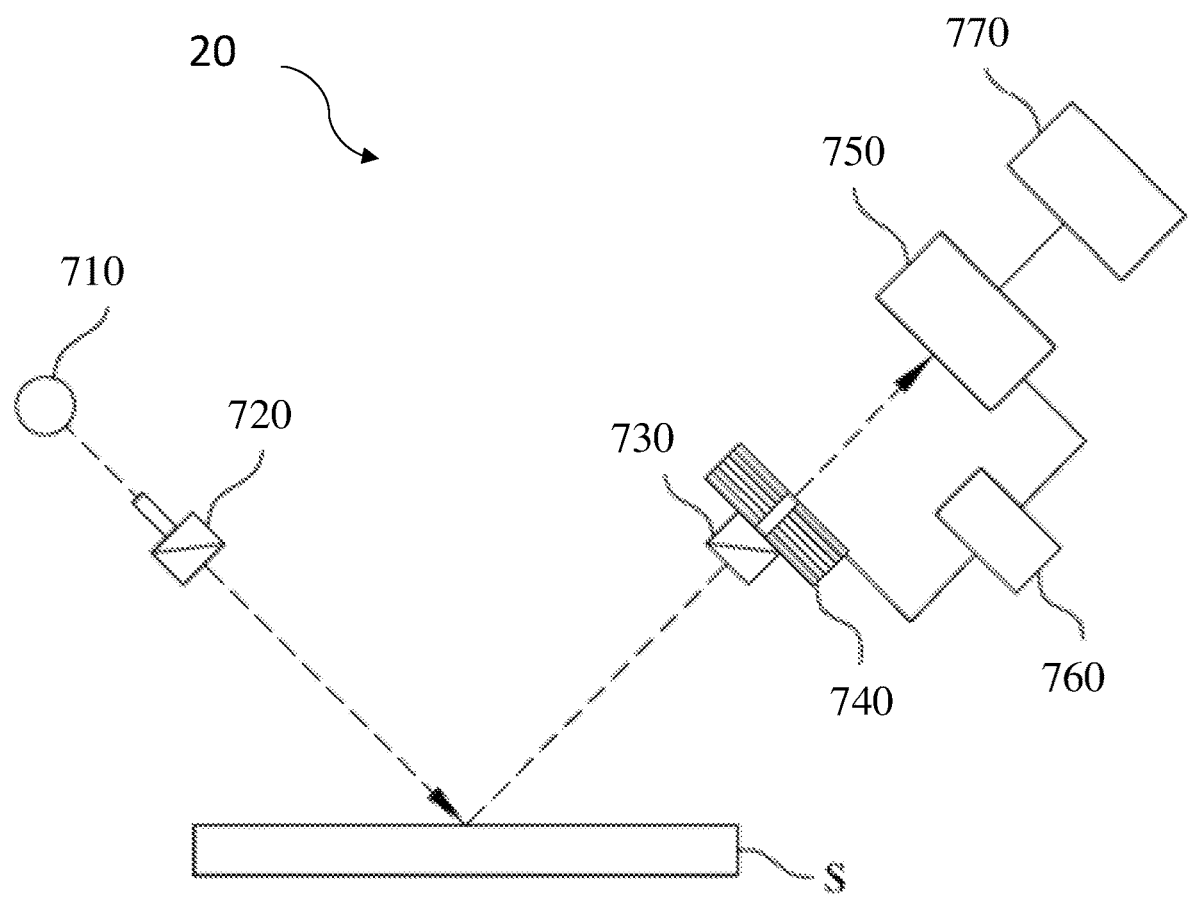
FIG. 7 is a schematic diagram of the measurement device according to a prior art.

FIG. 7 shows a schematic diagram of the measurement device 20 as illustrated in the Korean Patent No. 10-2531530. The measurement device comprises the light source 710, the first optical element 720, the second optical element 730, the rotation apparatus 740, the optical detector 750, the trigger generation module 760, the oval constant calculation unit 770, and the sample S.

The light source 710, which irradiates light to sample S, may generate light which includes near infrared ray and the far infrared ray.

The first optical element 720 serves to polarize the light generated by the light source 710. The first optical element 720, for example, can be a polarizer.

Comprising a substrate and multiple thin film layers formed on the substrate, sample S reflects a polarized light of which the properties are changed according to the optical and the structural features, such as, the refractive index and thickness of the substrate and thin film layers.

Arranged on the route of the reflection light, the second optical element 730 is used for detecting the polarization state of the light which is reflected in the sample S surface. The second optical element 730 can be an analyzer or the phase retarder.

The rotation apparatus 740 serves to rotate the first optical element 720 or the second optical element 730 at a constant speed. The rotation apparatus 740 can be the motor.

The optical detector 750, operating at a fixed exposure time based on the trigger signal, measures the light quantity of the light passing the second optical element 730. The optical detector 750 may be the charge coupled device (CCD).

The trigger generation module 760 generates the trigger signal according to the rotation of the rotation apparatus 740, and the trigger signal is delivered to the optical detector 750. For example, whenever the rotation apparatus 740 rotates 45 degrees, a trigger signal can be produced and delivered to the optical detector 750.

Comprising the encoder and the control circuit, the trigger generation module 760 rotates with the first optical element 720 or the second optical element 730 that is rotated by the rotation apparatus 740, and generates pulse signals at a constant interval. The control circuit generates a trigger signal of having a long cycle out of the multiple pulse signals having short cycles output by the encoder. In other way, when the number of pulse signals reaches a determined unit angle, trigger signal is generated.

The oval constant calculation unit 770 comprises the hardware equipped with CPU, the memory, and the storage unit such as the hard disk and SSD and the software for the oval counting constants.

The oval constant calculation unit 770 calculates the oval constant α and β based on ① the rotation angle ($A_{ex, trg}$) of the rotation apparatus 740 corresponding to the time to queue the trigger signals; ② the rotation angle ($A_{discharging}$) of the rotation apparatus 740 corresponding to the discharge time to remove the electric charge accumulated in the optical detector 750; and ③ the accumulated light quantity value ($S_i$) per the unit rotation angle of the rotation apparatus 740 measured by the optical detector 750.

Based on ①, ② and ③, the oval constant α and β can be calculated by the equations.

$$\alpha = \frac{2\pi}{N} \frac{1}{\sin\left(\frac{2\pi}{N}\right)} \left[\alpha'_2 \cos\left(\frac{2\pi}{N}\right) - \beta'_2 \sin\left(\frac{2\pi}{N}\right)\right]$$

$$\beta = \frac{2\pi}{N} \frac{1}{\sin\left(\frac{2\pi}{N}\right)} \left[\alpha'_2 \sin\left(\frac{2\pi}{N}\right) + \beta'_2 \cos\left(\frac{2\pi}{N}\right)\right]$$

In the equations, N is the number of times the accumulated light quantity is measured while the rotation apparatus 740 rotates at a cycle ($2\pi$). For example, if N is 8, the number of the measured accumulated light quantity is 8 with a 45-degree interval.

$\alpha_2'$ and $\beta_2'$ may be produced by the equations below.

$$\alpha'_2 = \frac{1}{I_0}[S_0 \cos(2\theta_0 - \theta'_0) + S_1 \cos(2\theta_1, \theta'_1) + \ldots S_{N-1} \cos(2\theta_{N-1}, \theta'_{N-1})]$$

$$\beta'_2 = \frac{1}{I_0}[S_0 \sin(2\theta_0 - \theta'_0) + S_1 \sin(2\theta_1, \theta'_1) + \ldots S_{N-1} \sin(2\theta_{N-1}, \theta'_{N-1})]$$

In the equations above, $\theta_i'$ is the sum total of $A_{discharging}$ and $A_{ex, trg}$.

$\theta_i$ is the initial angle of each accumulated light quantity measuring section.

$S_0$ to $S_{N-1}$ are accumulated light quantity values measured by the optical detector 750 for each measuring section.

For example, in case N is 8, $\theta_0=0$, $\theta_1=45$, and ... $\theta_7=315$. $I_0$ can be derived from the equation below.

$$I_0 = \frac{S_0 + S_1 + \ldots + S_{N-1}}{n}, \quad n \sim 2$$

The above stated provides an example of the device to measure the oval constants and the configuration thereof.

The analysis device 10 may also derive the attributes of the semiconductor that is the measurement target using a simulation model based on actual measurement data. Herein, the actual measurement data is the spectroscopic ellipsometry constant measured by the measurement device 20. In other words, the analysis device 10 may derive the thickness, refractive index, and extinction coefficient of each layer of the semiconductor to be measured through a simulation model using the actual measurement data provided by the measurement device 20.

Although the aforementioned analysis device 10 and measurement device 20 are described as being different devices, the present disclosure is not limited thereto. The aforementioned analysis device 10 and measurement device 20 may be implemented as one device or as two devices. For example, the analysis device 10 may be implemented as a single module within the measurement device 20.

Figure 3:
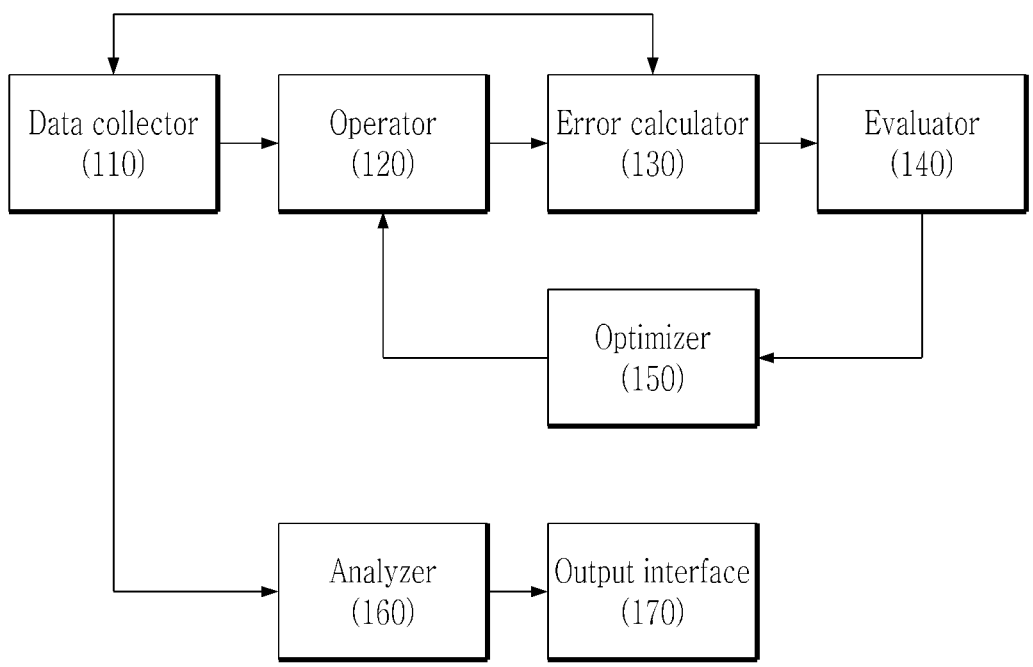
FIG. 3 is a diagram illustrating a configuration of an apparatus for spectroscopic ellipsometry constant analysis according to an embodiment of the present disclosure.

Next, the configuration of an apparatus for quality control and testing of manufactured semiconductors by generating a model for spectroscopic ellipsometry constant analysis according to an embodiment of the present disclosure will be described. FIG. 3 is a diagram illustrating a configuration of an apparatus for spectroscopic ellipsometry constant analysis according to an embodiment of the present disclosure.

Referring to FIG. 3, the analysis device 10 is configured to generate a simulation model, and includes a data collector 110, an operator 120, an error calculator 130, an evaluator 140, and an optimizer 150.

In order to generate a simulation model through optimization, the data collector 110 collects and stores attribute data representing attributes of the actually measured analysis target (for example, a substrate, thin film, semiconductor, etc.) and actual measurement data representing the spectroscopic ellipsometry constant actually measured for the analysis target. Herein, the attributes of the analysis target include the thickness, refractive index, and extinction coefficient of each layer of the analysis target. The attribute data used to generate the simulation model through optimization is directly measured using various methods according to the related art, and is provided to the operator 120. According to one embodiment, the actual measurement data may be the measured spectroscopic ellipsometry constant derived by the measurement device 20. The actual measurement data is provided to the error calculator 130. In addition, after the simulation model is generated through optimization, the data collector 110 may receive attribute data as initial values to measure the attributes of an actual semiconductor using the simulation model. The attribute data input as the initial value represents the attributes of the semiconductor design and is provided to an analyzer 160.

The operator 120 calculates simulation data representing the spectroscopic ellipsometry constant of the analysis target through reasoning on the attribute data representing the attributes of the analysis target using the simulation model (SM). As illustrated in FIG. 2, the simulation model (SM) of an embodiment of the present disclosure is a model that receives attribute data (x) of the analysis target and calculates simulation data representing the spectroscopic ellipsometry constant of the analysis target by performing reasoning on input attribute data. In other words, when the operator 120 inputs attribute data representing the attributes of the analysis target into the simulation model (SM), the simulation model (SM) calculates simulation data representing the spectroscopic ellipsometry constant of the analysis target reasoned through simulation of the attribute data. To this end, the simulation model (SM) includes one or more parameters and one or more operations to which the parameters are applied.

The error calculator 130 calculates an error representing a difference between actual measured data obtained by measuring the actually measured spectroscopic ellipsometry constant of the analysis target and the simulation data calculated through the simulation model (SM) by the operator 200. As indicated above, the actual measured data may be stored in the data collector 100. The actual measured data may be input into the error calculator 300 from the data collector 100 or from the operator 200.

The evaluator 140 determines (discriminates) whether the error $\chi^2$ calculated by the error calculator 130 is less than a preset error reference value $\chi_{min}^2$.

The optimizer 150 performs optimization to modify a parameter of the simulation model (SM) according to the error calculated by the error calculator 130. For example, when the evaluator 400 determines that the error is greater than or equal to the error reference value, the optimizer 500 may perform optimization to modify a parameter of the simulation model (SM) according to the error calculated by the error calculator 300. In this connection, the optimizer 150 performs optimization to modify a parameter of the simulation model (SM) so that the sum of squares of errors is minimized. Accordingly, the simulation model (SM) is modified. In particular, the optimizer 150 modifies a parameter of the model so that the sum of squares of errors is minimized, and performs optimization by applying a weight for each wavelength to a Jacobian size.

In addition, the analysis device 10 may derive the properties of the analysis target using the simulation model (SM). To this end, the analysis device 10 further includes the analyzer 160 and an output interface 170.

The analyzer 160 may receive attribute data representing the attributes of a semiconductor by a user, and receive actual measurement data from the measurement device 20. Herein, the attribute data input by the user may be attributes of the semiconductor, such as the thickness, refractive index, and extinction coefficient of each layer of the semiconductor, and may be attributes that match the design of a semiconductor manufacturer. In addition, the actual measurement data is the actually measured spectroscopic ellipsometry constant of the semiconductor to be measured by the measurement device 20.

The analyzer 160 performs reasoning on the attribute data and calculates simulation data representing the spectroscopic ellipsometry constant of a semiconductor. In other words, the analyzer 160 performs a simulation on the attribute data using the simulation model (SM) and calculates simulation data representing the spectroscopic ellipsometry constant of the semiconductor to be measured.

The analyzer 160 calculates an error representing a difference between actual measurement data and simulation data and discriminate whether the calculated error is less than a preset threshold.

In this connection, when an error is greater than a threshold, the analyzer 160 modifies the attribute data according to the size of the derived error, performs a simulation on the modified attribute data using the simulation model (SM) to calculate simulation data, calculates an error representing a difference between the calculated simulation data and the actual measurement data, and repeats a procedure of discriminating whether the calculated error is less than a preset error standard value.

Figure 4:
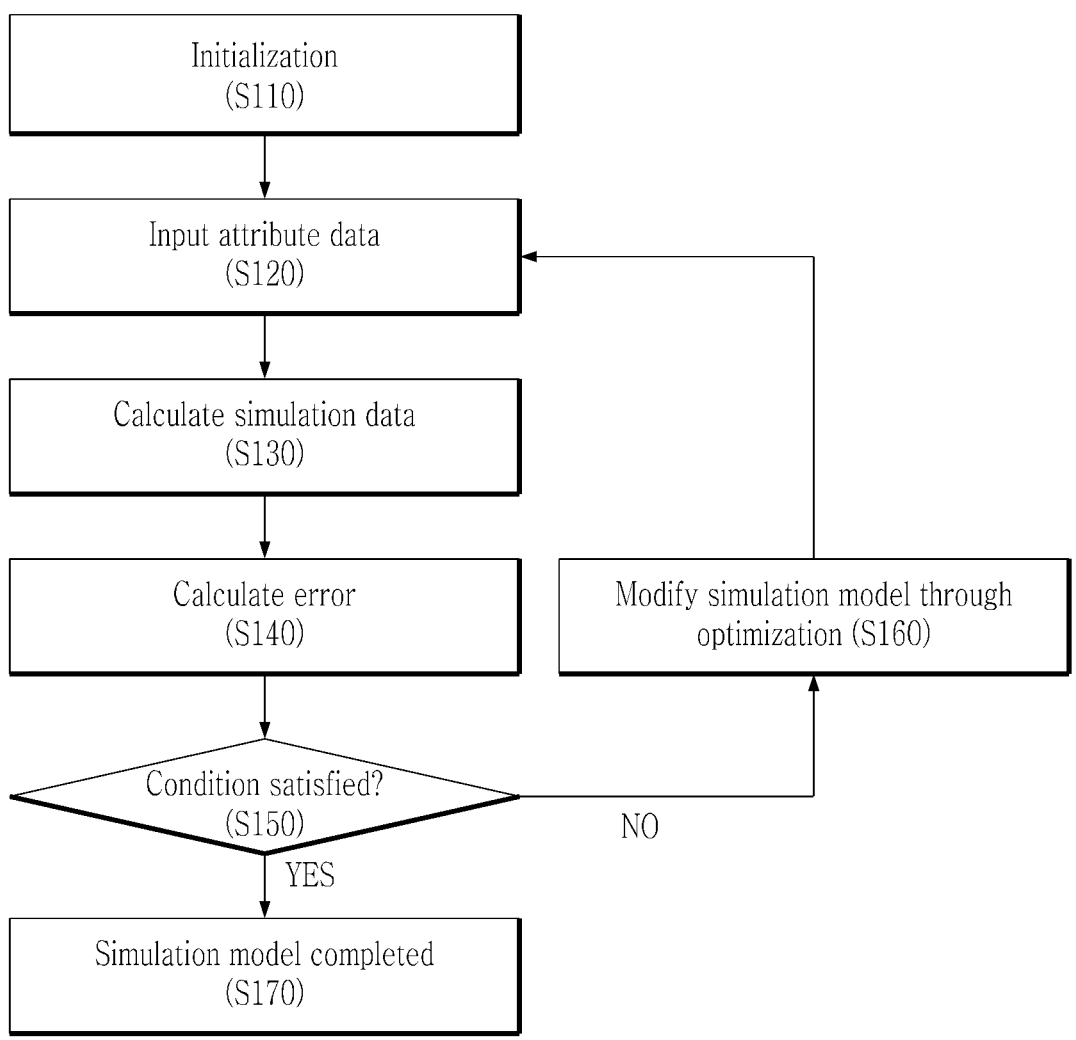
FIG. 4 is a flowchart illustrating a method for generating a model for spectroscopic ellipsometry constant analysis according to an embodiment of the present disclosure.

On the other hand, when an error is less than a threshold, the output interface 170 outputs attribute data in the case where the error is less than the threshold as a measurement result. In other words, the attribute data in the case where the simulation data and actual measurement data match less than the threshold is the attributes of the actually manufactured semiconductor (thickness, refractive index, and extinction coefficient of each layer of the semiconductor), and the output interface 170 outputs attribute data in the case where the simulation data and actual measurement data match less than a threshold as a measurement result. Next, a method for generating a model for spectroscopic ellipsometry constant analysis according to an embodiment of the present disclosure will be described. FIG. 4 is a flowchart illustrating a method for generating a model for spectroscopic ellipsometry constant analysis according to an embodiment of the present disclosure. The terms stage, step, and operation may be used interchangeably to refer to the steps shown in the flowchart in FIG. 2.

Referring to FIG. 4, it is assumed that the data collector 110 collects and stores actual measured data representing attributes of an analysis target (for example, a substrate, thin film, semiconductor, etc.) and actually measured spectroscopic ellipsometry constants for the actually measured analysis target. Herein, the attributes include materials and thickness, and are used as input data. In this connection, the spectroscopic ellipsometry constant may be measured through the measurement device 20. Herein, the attribute data is the actually measured attribute of an analysis target. In addition, attributes include thickness, refractive index, and extinction coefficient of each layer of the analysis target.

For example, when an analysis target is a thin film made of silicon formed on a substrate, the attribute data may be the thickness, refractive index, and extinction coefficient of the substrate and the thin film.

The calculator 120 initializes the simulation model (SM) in step (operation) S110, which means initializing parameters of the simulation model (SM).

The calculator 120 inputs the attribute data representing the attributes of the analysis target to the simulation model (SM) in step (operation) S120.

Then, the simulation model (SM) calculates simulation data representing the spectroscopic ellipsometry constant of the analysis target reasoned through the simulation of the attribute data in step (operation) S130.

The error calculator 130 calculates an error representing a difference between actual measured data representing the actually measured spectroscopic ellipsometry constant of the analysis target and the simulation data calculated earlier (step S130) in step (operation) S140. In this connection, the error calculator 130 may calculate the error through an error function according to Equation 1 or Equation 2 below.

$$\chi^2 = \frac{1}{2N-M} \sum_{j=1}^{N} [(\alpha_j^{mod} - \alpha_j^{exp})^2 + (\beta_j^{mod} - \beta_j^{exp})] \quad \text{[Equation 1]}$$

$$\chi^2 = \frac{1}{2N-M} \sum_{i=1}^{N} [(\Psi_i^{mod} - \Psi_i^{exp})^2 + (\Delta_i^{mod} - \Delta_i^{exp})^2] \quad \text{[Equation 2]}$$

In Equations 1 and 2, $\chi^2$ represents an error. In addition, N is the number of actual measured data or simulation data, and M is the number of parameters. In addition, j and i are an index of wavelengths.

In Equation 1, $\alpha_j^{mod}$ represents simulation data for a spectroscopic ellipsometry constant $\alpha$. $\alpha_j^{exp}$ represents actual measured data for the spectroscopic ellipsometry constant $\alpha$. $\beta_j^{mod}$ represents simulation data for a spectroscopic ellipsometry constant $\beta$. In addition, $\beta_j^{exp}$ represents actual measured data for the spectroscopic ellipsometry constant $\beta$.

In Equation 2, $\Psi_i^{mod}$ represents simulation data for a spectroscopic-ellipsometry constant $\Psi$. $\Psi_i^{exp}$ represents actual measured data for the spectroscopic ellipsometry constant $\Psi$. $\Delta_i^{mod}$ represents simulation data for a spectroscopic ellipsometry constant $\Delta$. In addition, $\Delta_i^{exp}$ represents actual measured data for the spectroscopic ellipsometry constant $\Delta$.

Next, the evaluator 140 determines (discriminates) whether the error $\chi^2$ previously calculated (step S140) is less than a preset error reference value $\chi_{min}^2$ in step (operation) S150.

According to the determination (discrimination) in step S150, when the error is equal to or greater than the error reference value, the method for generating a model for spectroscopic ellipsometry constant analysis proceeds to step (operation) 160, and when the error is less than the error reference value, the method for generating a model for spectroscopic ellipsometry constant analysis proceeds to step (operation) 170.

Other embodiments are also contemplated for step S150. For example, when the error is greater than the error reference value, the method for generating a model for spectroscopic ellipsometry constant analysis may proceed to step (operation) 160, and when the error is equal to or less than the error reference value, the method for generating a model for spectroscopic ellipsometry constant analysis may proceed to step (operation 170).

In step S160, the optimizer 150 performs optimization to modify a parameter of the simulation model (SM) so that the sum of squares of errors is minimized. Accordingly, the simulation model (SM) is modified. Then, steps S120 to S150 described above are repeated.

In describing step S160 in more detail, when the actual measurement data is $(x_i, y_i)$, i=1, 2, . . . , n, the parameter of the model for optimization is $p=(p_1, p_2, \ldots, p_m)$, the simulation model (SM) is "y=f(x, p)," and the error between the actual measured data and the simulation data is $r_i$, the optimizer 150 modifies a parameter p of the simulation model (SM) so that the sum of squares of errors is minimized as shown in Equation 3 below.

$$p = \operatorname{argmin} \sum_{i=1}^{n} r_i^2 = \operatorname{argmin} \sum_{i=1}^{n} [y_i - f(x, p)]^2 \quad \text{[Equation 3]}$$

In particular, the optimizer 150 modifies the parameter of the simulation model (SM) so that the sum of squares of errors is minimized, and performs optimization by applying a weight for each wavelength to the Jacobian size.

Specifically, the optimizer 150 performs optimization by applying a weight for each wavelength according to Equation 4 below.

$$p_{k+1} = p_k - (J_r'^T J_r' + \mu_k \operatorname{diag}(J_r'^T J_r'))^{-1} J_r'^T r'(p_k), k \geq 0 \quad \text{[Equation 4]}$$

$$r'(p) = \omega(\lambda) r(p)$$

$$r(p) = \begin{bmatrix} r_1(p) \\ r_2(p) \\ \vdots \\ r_n(p) \end{bmatrix} = \begin{bmatrix} y_1 - f(x_1, p) \\ y_2 - f(x_2, p) \\ \vdots \\ y_n - f(x_n, p) \end{bmatrix}$$

$$J_r'(p) = \begin{pmatrix} \frac{\partial r_1'(p)}{\partial p_1} & \cdots & \frac{\partial r_1'(p)}{\partial p_m} \\ \vdots & \ddots & \vdots \\ \frac{\partial r_n'(p)}{\partial p_1} & \cdots & \frac{\partial r_n'(p)}{\partial p_m} \end{pmatrix}$$

Herein, p represents a parameter of the simulation model (SM). In addition, k is an index of iteration. r(p) represents a residual. In particular, $\omega(\lambda)$ represents a weight for each wavelength. Accordingly, r'(p) represents a residual to which a weight for each wavelength is applied. In addition, $J_r'$ represents a Jacobian matrix. $\mu_k$ is a damping factor and has a value of constant multiplication of an identity matrix. In addition, $\operatorname{diag}(J_r'^T J_r')$ represents a diagonal matrix that maintains the diagonal elements of $J_r'^T J_r'$ and sets the values of the remaining elements to 0.

As a specific example, the optimizer 150 may give different weights for each wavelength in three regions divided into 170 nm to 300 nm, 300 nm to 900 nm, and 900 nm to 1,700 nm in the case of the entire wavelength range of 170 nm to 1,700 nm, based on thin film measurement to perform optimization.

As described above, as a result of the determination (discrimination) in step S140, when the error is less than an error reference value, step S160 proceeds to complete the simulation model (SM).

According to an embodiment of the present disclosure, when optimizing to generate the simulation model (SM), a degree of convergence according to the change in the parameter (p) of the simulation model (SM) can be adjusted for each wavelength by applying a weight for each wavelength to a Jacobian size, which is a partial differential method. Accordingly, it is possible to stably increase the contribution of a wavelength band by giving a small weight to a wavelength band with high noise among actual measurement data and a large weight to a stable wavelength band with low noise without affecting error $\chi^2$ calculation.

Figure 5:
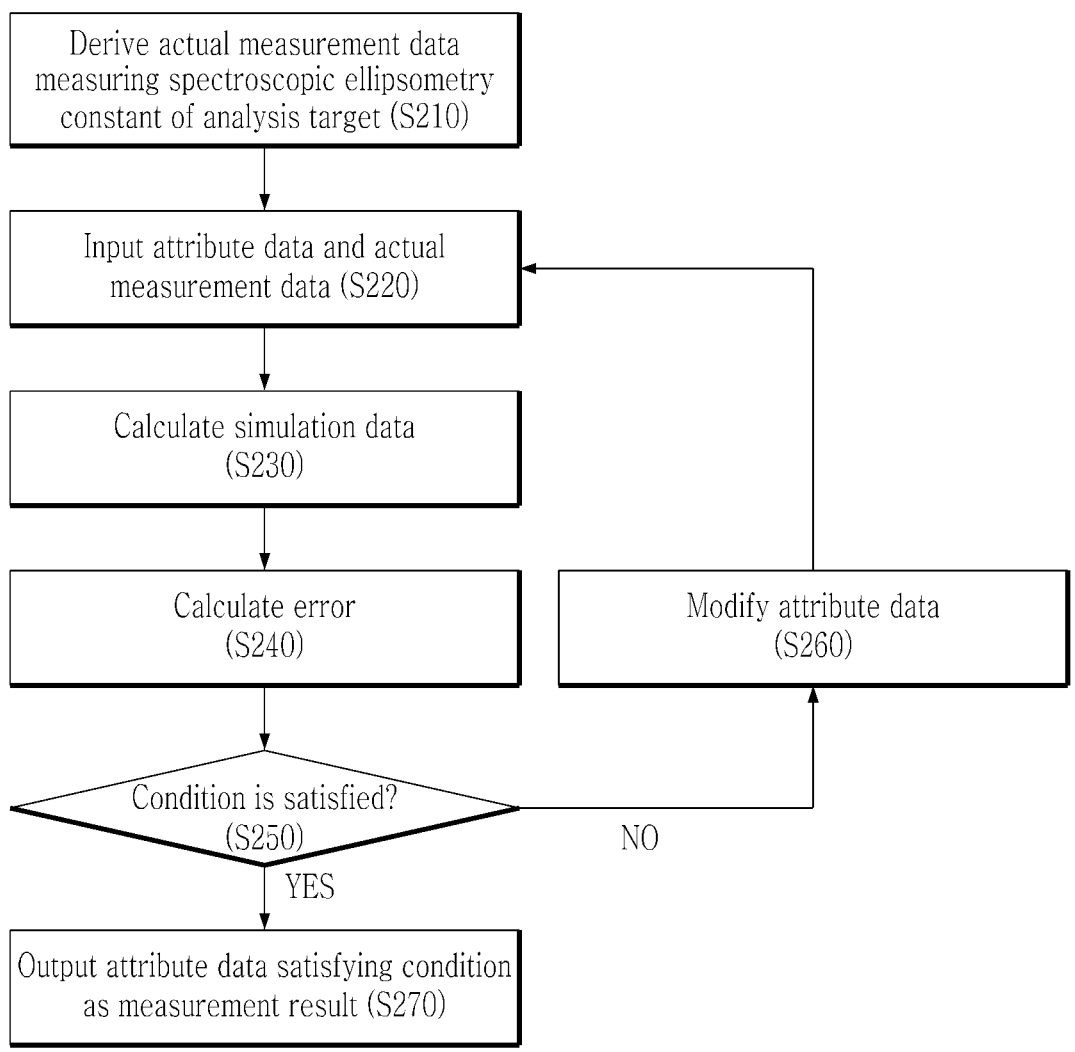
FIG. 5 is a flowchart illustrating a method for measuring an attribute of a semiconductor using the simulation model according to an embodiment of the present disclosure.
Figure 6:
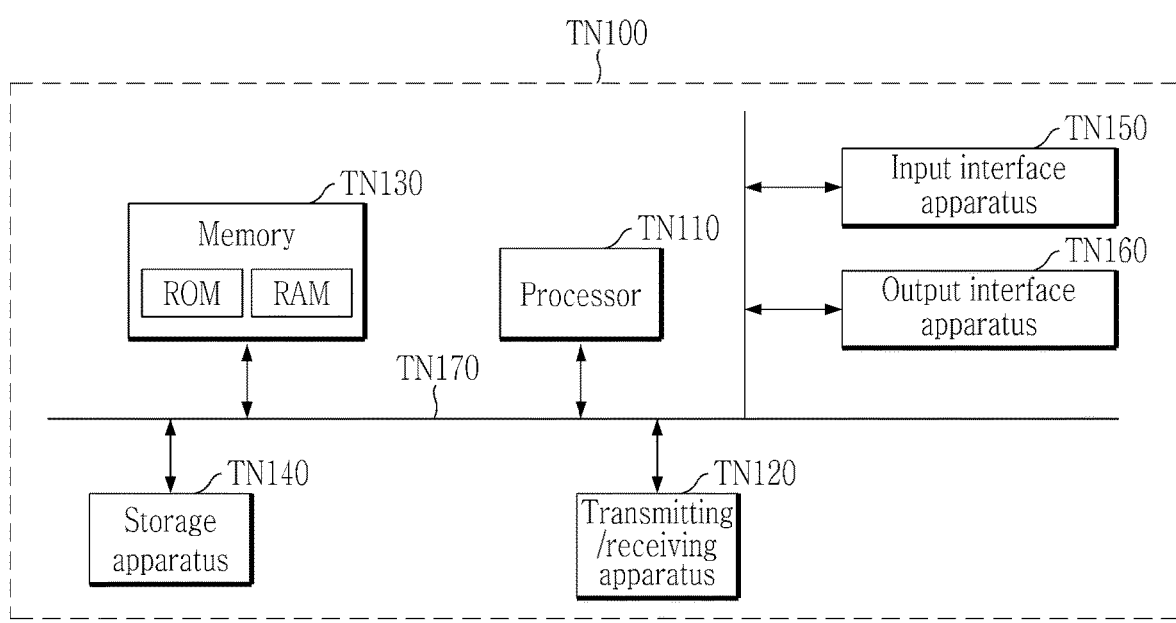
FIG. 6 is a diagram illustrating a computing device according to an embodiment of the present disclosure.

Next, a method for measuring a semiconductor manufactured according to a semiconductor manufacturing process using a simulation model optimized according to the aforementioned method will be described. FIG. 5 is a flowchart illustrating a method for measuring an attribute of a semiconductor using the simulation model according to an embodiment of the present disclosure. This embodiment of FIG. 5 assumes a situation in which a semiconductor manufacturer measures the attributes of a semiconductor produced through a semiconductor manufacturing process. Referring to FIG. 6, a semiconductor (sample) to be measured is loaded by a user into the measurement device 20, and the design attributes of the semiconductor are input as attribute data to the analysis device 10, thereby starting measurement of the semiconductor.

The measurement device 20 measures the spectroscopic ellipsometry constant of the semiconductor to be measured in step S210 and derives actual measurement data. The measurement device 20 may derive the spectroscopic ellipsometry constant through a spectroscopic ellipsometer.

The analyzer 160 of the analysis device 10 may receive the attributes of a semiconductor in the design as attribute data by a user through the data collector 110 in step S220 and receive actual measurement data from the measurement device 20. Herein, the attribute data, which is the attribute of the semiconductor input by the user, means the attribute that matches the design of a semiconductor manufacturer. These attributes include the thickness, refractive index, and extinction coefficient of each layer of the semiconductor.

The analyzer 160 performs reasoning on the attribute data through the simulation model in step S230 to calculate simulation data representing the spectroscopic ellipsometry constant of a semiconductor. Herein, the parameters of the simulation model are determined through the same procedure as the embodiment of FIG. 5. In other words, the analyzer 160 calculates simulation data by performing a simulation on attribute data using the simulation model (SM).

Then, in step S240, the analyzer 160 calculates an error representing a difference between the actual measurement data measured by the measurement device 20 previously (S210) and the simulation data calculated previously (S230). In this connection, the analyzer 160 may calculate the error through an error function according to Equation 1 or Equation 2.

Next, in step S250, the analyzer 160 discriminates whether the error calculated previously (S240) is less than a preset threshold.

According to the discrimination in step S250, when an error is greater than or equal to a threshold, the process proceeds to step S260. The analyzer 160 modifies the attribute data according to the size of the error derived in step S250. For example, the thickness of each layer of a semiconductor may be changed in proportion to the size of the error. Then, steps S230 to S250 described above are repeated according to the modified attribute data. In other words, the analyzer 160 performs a simulation on the modified attribute data using the simulation model (SM) to calculate simulation data representing the spectroscopic ellipsometry constant of the semiconductor to be analyzed, calculates an error representing a difference between the calculated simulation data and actual measurement data, and repeats the procedure of discriminating whether the calculated error is less than a preset error standard value.

According to the discrimination in step S250, when an error is less than a threshold, the process proceeds to step S270.

In step S270, the output interface 170 outputs attribute data in the case where the condition that an error is less than a threshold is satisfied based on the discrimination in step S250 as a measurement result. This means that the attribute data in the case where the simulation data and actual measurement data match less than the threshold is the attributes of the actually manufactured semiconductor (thickness, refractive index, and extinction coefficient for each layer of a semiconductor). Accordingly, the output interface 170 outputs attribute data in the case where the simulation data and actual measurement data match less than the threshold as a measurement result. Accordingly, a user may compare the attributes of the semiconductor represented by the attribute data output as a measurement result with the attributes that match the design of a semiconductor manufacturer to determine whether the semiconductor has been manufactured correctly according to the intended purpose.

Based on this present disclosure, such quality and testing can be performed by determining whether the semiconductors are manufactured correctly by comparing the difference between the attribute data of the simulation and the data actually measured with the threshold based on the measurement result.

FIG. 6 is a diagram illustrating a computing device according to an embodiment of the present disclosure. A computing device TN100 of FIG. 6 may be a device described in the present specification (for example, the analysis device 10, the measurement device 20, etc.).

In the embodiment of FIG. 6, the computing device TN100 may include at least one processor TN110, a transmitting/receiving apparatus TN120, and a memory TN130. The memory TN130 may include one or more memories. Further, the computing device TN100 may further include a storage apparatus TN140, an input interface apparatus TN150, and an output interface apparatus TN160. The storage apparatus TN140 may include one or more memories. Components included in the computing device TN100 may be connected to each other by a bus TN170 to communicate with each other.

The processor TN110 may run a program command that is stored in at least one of the memory TN130 and the storage apparatus TN140. The processor TN110 may mean a central processing unit (CPU), a graphics processing unit (GPU), or an exclusive processor that performs the methods according to the exemplary embodiments of the present disclosure. The processor TN110 may be configured to implement the procedures, the functions, and the methods described with reference to the exemplary embodiments of the present disclosure. The processor TN110 may control each of the components of the computing device TN100.

The memory TN130 and the storage apparatus TN140 may each store various information associated with the operation of the processor TN110. The memory TN130 and the storage apparatus TN140 may each be configured of at least one of a volatile storage medium and a non-volatile storage medium. For example, the memory TN130 may be configured of at least one of a read only memory (ROM) and a random access memory (RAM).

The transmitting/receiving apparatus TN120 may transmit or receive a wired signal or a wireless signal. The transmitting/receiving apparatus TN120 may be connected to a network to perform communication.

Various methods according to the embodiments of the present disclosure described above may be implemented in a program form readable through various components on a computer, and may be recorded in computer-readable recording media. Herein, the recording media may include, alone or in combination with the program instructions, data files, data structures, and the like. The program instructions recorded on the recording media may be those specially designed and constructed for the purposes of the present disclosure or they may be of the kind well known and available to those skilled in the computer software arts. Examples of the recording media include magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, flash memory, and the like. Examples of program instructions may include both machine codes, such as produced by a compiler, and higher-level codes that may be executed by the computer using an interpreter. These hardware devices may be configured to act as one or more software modules to perform the operations of the present disclosure, and vice versa.

Although the embodiments of the present disclosure have been described above, it should be noted that one of ordinary skill in the art may make a variety of modifications and changes of the present disclosure by adding, changing, eliminating, inserting, or the like of components without departing from the ideas of the present disclosure which is disclosed in the claims and this will be included within the scope of right of the present disclosure.

DETAILED DESCRIPTION OF MAIN ELEMENTS

10: Analysis device
20: Measurement device
110: Data collector
120: Operator
130: Error calculator
140: Evaluator
150: Optimizer
160: Analyzer
170: Output interface
710: Light source
720: First optical element
730: Second optical element
740: Rotation apparatus
750: Optical detector
760: Trigger generation module
S: Sample

The invention claimed is:

1. A method for quality control and testing of manufactured semiconductors by generating a model for spectroscopic ellipsometry constant analysis, the method comprising:

calculating, by an operator, simulation data representing a spectroscopic ellipsometry constant of an analysis target through reasoning on attribute data representing an attribute of the analysis target using a simulation model;

calculating, by an error calculator, an error representing a difference between actual measurement data obtained by measuring the spectroscopic ellipsometry constant of the analysis target and the simulation data; and performing optimization in which an optimizer modifies a parameter of the simulation model according to the error, wherein the performing optimization of the parameter comprising optimizing a parameter p according to an equation:

$$p_{k+1}=p_k-(J_r'^T J_r'+\mu_k \text{diag}(J_r'^T J_r'))^{-1} J_r'^T r'(p_k), k \geq 0$$

$$r'(p)=\omega(\lambda)r(p)$$

wherein:
p is a parameter of the simulation model;
k is an index of iteration;
r(p) represents a residual;
$\omega(\lambda)$ is a weight for each wavelength;
r'(p) is a residual weighted for each wavelength;
$J_r'$ is a Jacobian matrix;
$\mu_k$ is a damping factor;
$\text{diag}(J_r'^T J_r')$ is a diagonal matrix of $J_r'^T J_r'$;
$J_r'^T$ is a transpose matrix of $J_r'$; and
T is a mathematical symbol representing the transpose matrix.

2. The method of claim 1, wherein, in the performance of the optimization, the optimizer modifies the parameter of the simulation model so that the sum of squares of errors is minimized.

3. The method of claim 1, wherein, in the performance of the optimization, the optimizer modifies the parameter of the simulation model so that the sum of squares of errors is minimized, and performs optimization by applying a weight for each wavelength to a Jacobian size.

4. The method of claim 1, wherein, in the calculation of the error, the error calculator calculates the error according to an error function:

$$\chi^2 = \frac{1}{2N-M} \sum_{j=1}^{N} \left[ \left( \alpha_j^{mod} - \alpha_j^{exp} \right)^2 + \left( \beta_j^{mod} - \beta_j^{exp} \right)^2 \right],$$

wherein:
$\chi^2$ is an error;
N is the number of actual measured data;
M is the number of parameters;
j is an index of wavelengths;
$\alpha_j^{mod}$ is simulation data for a spectroscopic ellipsometry constant $\alpha$;
$\alpha_j^{exp}$ is actual measured data for the spectroscopic ellipsometry constant $\alpha$;
$\beta_j^{mod}$ is simulation data for a spectroscopic ellipsometry constant $\beta$; and
$\beta_j^{exp}$ is actual measured data for the spectroscopic ellipsometry constant $\beta$.

5. The method of claim 1, wherein, in the calculation of the error, the error calculator calculates the error according to an error function:

$$\chi^2 = \frac{1}{2N-M} \sum_{i=1}^{N} \left[ \left( \Psi_i^{mod} - \Psi_i^{exp} \right)^2 + \left( \Delta_i^{mod} - \Delta_i^{exp} \right)^2 \right]$$

wherein:
$\chi^2$ is an error;
N is the number of actual measured data;
M is the number of parameters;
i is an index of wavelengths;
$\Psi_i^{mod}$ is simulation data for a spectroscopic ellipsometry constant $\Psi$;
$\Psi_i^{exp}$ is actual measured data for the spectroscopic ellipsometry constant $\Psi$;
$\Delta_i^{mod}$ is simulation data for a spectroscopic ellipsometry constant $\Delta$; and
$\Delta_i^{exp}$ is actual measured data for the spectroscopic ellipsometry constant $\Delta$.

6. The method of claim 1, further comprising:
performing actual measurement in which a measuring device measures the spectroscopic ellipsometry constant of a semiconductor to be measured and derives actual measurement data representing the actually measured spectroscopic ellipsometry constant of the semiconductor;
performing a simulation in which an analyzer receives attribute data representing an attribute of the semiconductor, performs the reasoning on the attribute data through the simulation model in which the parameter is decided, and calculates the simulation data representing the spectroscopic ellipsometry constant of the semiconductor;
performing error derivation in which the analyzer derives an error representing a difference between the actual measurement data and the simulation data;
performing repetition in which the analyzer modifies the attribute data until the error becomes less than a preset threshold, and repeats the simulation and the error derivation based on the modified attribute data; and
outputting the modified attribute data as a measurement result when the error becomes less than the preset threshold.

7. The method of claim 1, further comprising determining whether the semiconductor has been manufactured correctly as designed.

8. A system for quality control and testing of manufactured semiconductors by generating a model for spectroscopic ellipsometry constant analysis, the system comprising:
an operator that calculates simulation data representing a spectroscopic ellipsometry constant of an analysis target through reasoning on attribute data representing an attribute of the analysis target using a simulation model;
an error calculator that calculates an error representing a difference between actual measured data obtained by measuring the spectroscopic ellipsometry constant of the analysis target and the simulation data; and
an optimizer that performs optimization to modify a parameter of the simulation model according to the error,
wherein the performing optimization of the parameter comprising optimizing a parameter p according to an equation:

$$p_{k+1} = p_k - (J_r'^T J_r' + \mu_k \, diag(J_r'^T J_r'))^{-1} J_r'^T r'(p_k), k \geq 0$$

$$r'(p) = \omega(\lambda) r(p)$$

wherein:
p is a parameter of the simulation model;
k is an index of iteration;
r(p) represents a residual;
$\omega(\lambda)$ is a weight for each wavelength;
r'(p) is a residual weighted for each wavelength;
$J_r'$ is a Jacobian matrix;
$\mu_k$ is a damping factor; and
$diag(J_r'^T J_r')$ is a diagonal matrix of $J_r'^T J_r'$;
$J_r'^T$ is a transpose matrix of $J_r'$; and
T is a mathematical symbol representing the transpose matrix.

9. The system of claim 8, wherein the optimizer modifies the parameter of the simulation model so that the sum of squares of errors is minimized.

10. The system of claim 8, wherein the optimizer modifies the parameter of the simulation model so that the sum of squares of errors is minimized, and performs optimization by applying a weight for each wavelength to a Jacobian size.

11. The system of claim 8, wherein the error calculator calculates the error according to an error function:

$$\chi^2 = \frac{1}{2N-M} \sum_{j=1}^{N} [(\alpha_j^{mod} - \alpha_j^{exp})^2 + (\beta_j^{mod} - \beta_j^{exp})],$$

wherein:
$\chi^2$ is an error,
N is the number of actual measured data;
M is the number of parameters;
j is an index of wavelengths;
$\alpha_j^{mod}$ is simulation data for a spectroscopic ellipsometry constant $\alpha$;
$\alpha_j^{exp}$ is actual measured data for the spectroscopic ellipsometry constant $\alpha$;
$\beta_j^{mod}$ is simulation data for a spectroscopic ellipsometry constant $\beta$; and
$\beta_j^{exp}$ is actual measured data for the spectroscopic ellipsometry constant $\beta$.

12. The system of claim 8, wherein the error calculator calculates the error according to an error function:

$$\chi^2 = \frac{1}{2N-M} \sum_{i=1}^{N} [(\Psi_i^{mod} - \Psi_i^{exp})^2 + (\Delta_i^{mod} - \Delta_i^{exp})^2]$$

wherein:
$\chi^2$ is an error,
N is the number of actual measured data;
M is the number of parameters;
i is an index of wavelengths;
$\Psi_i^{mod}$ is simulation data for a spectroscopic ellipsometry constant $\Psi$;
$\Psi_j^{exp}$ is actual measured data for the spectroscopic ellipsometry constant $\Psi$;
$\Delta_i^{mod}$ is simulation data for a spectroscopic ellipsometry constant $\Delta$; and
$\Delta_i^{exp}$ is actual measured data for the spectroscopic ellipsometry constant $\Delta$.

13. The system of claim 8, further comprising:
a measuring device that measures a spectroscopic ellipsometry constant of a semiconductor to be measured and derives actual measurement data representing the actually measured spectroscopic ellipsometry constant of the semiconductor;
a simulation processor that receives the attribute data representing an attribute of the semiconductor, performs the reasoning on the attribute data through the simulation model in which the parameter is decided, and calculates the simulation data representing the spectroscopic ellipsometry constant of the semiconductor; and an analyzer that performs an error derivation process that derives an error representing the difference between the actual measurement data and the simulation data, modifies the attribute data until the error becomes less than a preset threshold, and repeats the simulation process and the error derivation process based on the modified attribute data, wherein the modified attribute data is output as a measurement result when the error becomes less than the preset threshold.

14. The system of claim 13, wherein the measuring device comprises:
   a light source for irradiating light to a sample;
   a first optical element for polarizing the light generated by the light source;
   a second optical element for detecting a polarization state of the light reflected on the sample; and
   a rotation device including a motor for rotate the first optical element or the second optical element at a constant speed; and
   an optical detector for measuring a quantity of the light passing the second optical element.

* * * * *